(12) United States Patent
Estrada

(10) Patent No.: US 12,426,524 B2
(45) Date of Patent: Sep. 30, 2025

(54) SUPPORT AID FOR DIGGING

(71) Applicant: Jose Nestor Estrada, Dickerson, MD (US)

(72) Inventor: Jose Nestor Estrada, Dickerson, MD (US)

( * ) Notice: Subject to any disclaimer, the term of this patent is extended or adjusted under 35 U.S.C. 154(b) by 890 days.

(21) Appl. No.: 17/681,332

(22) Filed: Feb. 25, 2022

(65) Prior Publication Data
US 2023/0270034 A1    Aug. 31, 2023

(51) Int. Cl.
*A01B 1/02* (2006.01)

(52) U.S. Cl.
CPC .................. *A01B 1/028* (2013.01)

(58) Field of Classification Search
CPC .............. A01B 1/028; A01B 1/026
USPC ....................................... 294/58, 59
See application file for complete search history.

(56) References Cited

U.S. PATENT DOCUMENTS

| | | | | |
|---|---|---|---|---|
| 1,296,738 A * | 3/1919 | Bekke | ............... | A01B 1/028 254/131.5 |
| 2,269,119 A * | 1/1942 | Mason | ............... | A01B 1/028 254/131.5 |
| 4,461,458 A * | 7/1984 | Poulin | ............... | A01B 1/028 294/59 |
| 4,881,332 A * | 11/1989 | Evertsen | ............... | A01B 1/028 37/285 |
| 4,911,575 A * | 3/1990 | Tidwell | ............... | E04F 21/245 404/112 |
| 5,330,010 A * | 7/1994 | Smotherman | ............ | A01B 1/16 172/378 |
| 5,732,933 A | 3/1998 | Champi | | |
| 6,086,049 A * | 7/2000 | Sheils | ............... | A01B 1/028 294/59 |
| 6,371,542 B1 * | 4/2002 | Hasbani | ............... | A01B 1/028 294/59 |
| 6,922,920 B1 | 8/2005 | Stratz | | |
| 10,694,652 B2 * | 6/2020 | Cote | ............... | A01B 1/028 |
| 11,083,122 B1 * | 8/2021 | Dombrowski | ............ | E01H 5/02 |
| 2015/0195985 A1 | 7/2015 | Gershman | | |
| 2021/0185871 A1 | 6/2021 | Scofield | | |

* cited by examiner

*Primary Examiner* — Paul T Chin
(74) *Attorney, Agent, or Firm* — Jerome Drabiak; Edison Law Group

(57) ABSTRACT

A support aid for digging and prying when using a shovel is disclosed. The support aid allows a shovel user to support the weight of a load by use of a support shaft. A user pivots a load from one position to another more ergonomic position using the support shaft. An end of the support shaft has a channel freely slidable along a handle of a shovel, for allowing a fulcrum, which is defined by a point of contact between the handle and the channel, to be quickly moved along the handle. The channel is configured for allowing the shovel shaft to freely rotate about an axis, enabling a user to quickly change a shovel blade angle relative to the ground or relative to a load at any time. In this way, ergonomic application of the inherent mechanical advantage of a handle of a shovel is provided to users of the support.

12 Claims, 4 Drawing Sheets

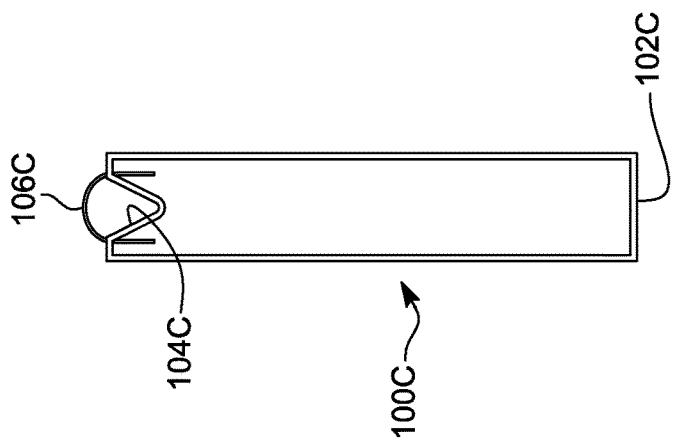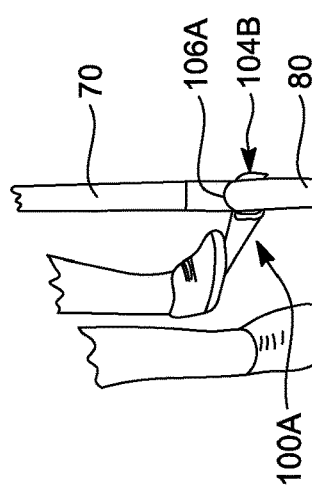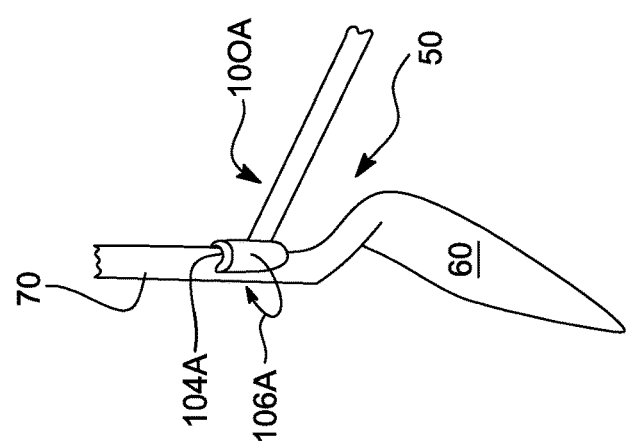
FIG. 5
FIG. 6
FIG. 7
FIG. 8

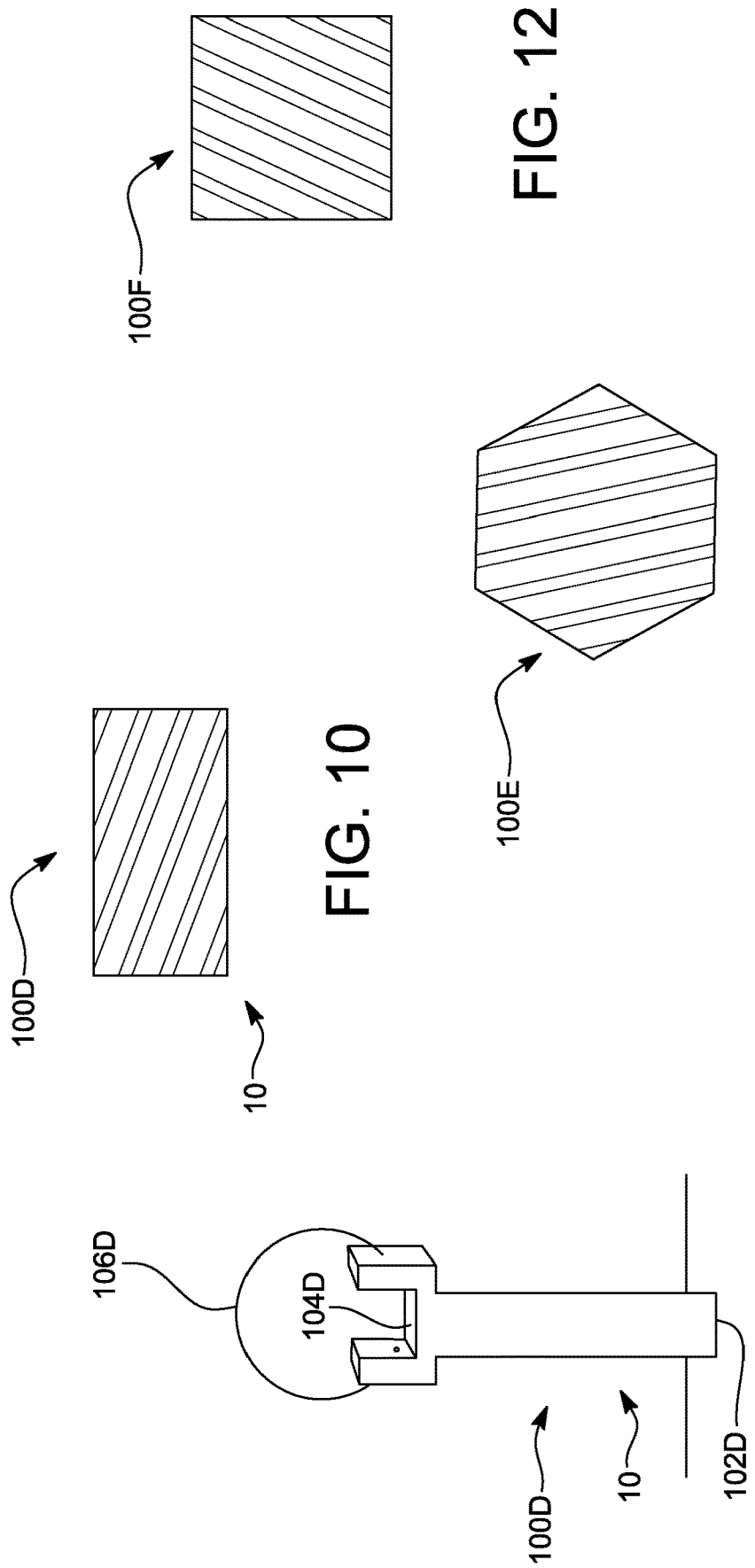

SUPPORT AID FOR DIGGING

FIELD

The present subject matter, in general, involves tools designed for use with a shovel and, in particular, is directed to a tool for use as a support aid for digging.

BACKGROUND

Spades, shovels, snow scoops, and the like have long been used by people to transport such loads as clods of soil, measured amounts of sand, and seasonal amounts of snow, both fluffy and "heavy," from a first location to a second location.

Numerous medical experts have long suggested that such human ailments as strained back muscles and spinal joint injuries can be reduced by avoiding moving heavy loads. Mechanical assistance mechanisms for shovels have resulted.

For instance, in U.S. Pat. No. 6,086,049 to Sheils an accessory for a shovel is disclosed. This accessory for a shovel was designed to assist a user when lifting and moving material located within a scoop portion of the shovel. This shovel accessory includes a ground-contacting support rod attached to a handle of the shovel. Summarizing the relevant prior art that I found: U.S. Pat. No. 4,881,332 to Evertsen, U.S. Pat. No. 5,732,933 to Champi, U.S. Pat. No. 6,922,920 to Stratz, US published patent application 2015/0195985 to Gershman, and US published patent application 2021/0185871 to Scofield each disclose a variety of other accessories for a shovel.

My review of these US patent references has revealed that they do not individually anticipate or collectively render obvious to one of ordinary skill in this field, the present subject matter—i.e., my invention—which I will now summarize.

The present subject matter is directed to a novel aid for digging and prying when using a shovel. This innovative aid allows a user of the shovel to support the weight of a load by means of a support shaft, thus allowing the user to pivot the load from one position to another position, or to a more ergonomic position, using the support shaft. In operation, one end portion of the support shaft defines a channel that is freely slidable along a handle (or shaft) of the shovel, which allows the position of a fulcrum, defined by a point of contact between the shovel shaft and the channel, to be quickly moved along the shovel by a user. In addition, the channel is configured to allow the shovel shaft to freely rotate about an axis, which allows a user to quickly change an angle of the shovel blade relative to the ground or relative to a load at any time. When deployed, the aid allows more ergonomic application of the inherent mechanical advantage of a shovel, as provided by its handle, and supports a load for a user when a load is raised above the ground. The term "fulcrum," throughout this patent specification, shall be understood to mean a support (or point of support) upon which a lever turns in raising or moving a load.

The present subject matter is directed to a novel support for a shovel having a blade designed to engage a load. The shovel includes a shaft or handle configured for enabling a user to use the blade to engage the load, such as by digging or prying.

The support consists of only three components, namely: (1) an integral base at one end of the support; (2) an integral channel at an opposite end of the support; and (3) a retainer for securing the handle in the channel. The handle defines a first longitudinal axis. The support defines a second longitudinal axis. The shovel handle is rotatable in the channel about the first axis relative to the support. The channel is pivotable about the base when the base is supported on or by the ground. The first and second longitudinal axes intersect in or substantially within the channel.

After the detailed description is read by those of ordinary skill in this field, it is believed that many advantages of the present subject matter will be appreciated.

BRIEF DESCRIPTION OF THE DRAWINGS

FIG. 5 is a hand drawn sketch showing a detail as to how a shovel is held.

FIG. 6 is yet another hand drawn sketch providing details regarding how a person is able to use a foot to secure a base portion of the support to the ground.

FIG. 7 is a sketch of a second embodiment of a support aid which can be used by a person to add mechanical advantage to an ordinary task of using a shovel.

FIG. 8 is a sketch of a third embodiment of a support aid which can be used by a person to add mechanical advantage to an ordinary task of using a shovel.

FIG. 9 is yet another hand drawn sketch, presented as a perspective view, of a fourth embodiment of a support aid which, by its design, can be used by a person to add further mechanical advantage to an ordinary task of using a shovel.

FIG. 10 is a sectional view (on an enlarged scale), taken from the plane 10-10 in FIG. 9, of the longitudinal shaft of the fourth support aid embodiment.

FIG. 11 is a sectional view (on an enlarged scale) of a fifth embodiment.

FIG. 12 is a sectional view (on an enlarged scale) of a sixth embodiment.

Throughout the drawing figures and detailed description, I shall use similar reference numerals to refer to similar components of the present subject matter.

DETAILED DESCRIPTION

Figure 1:
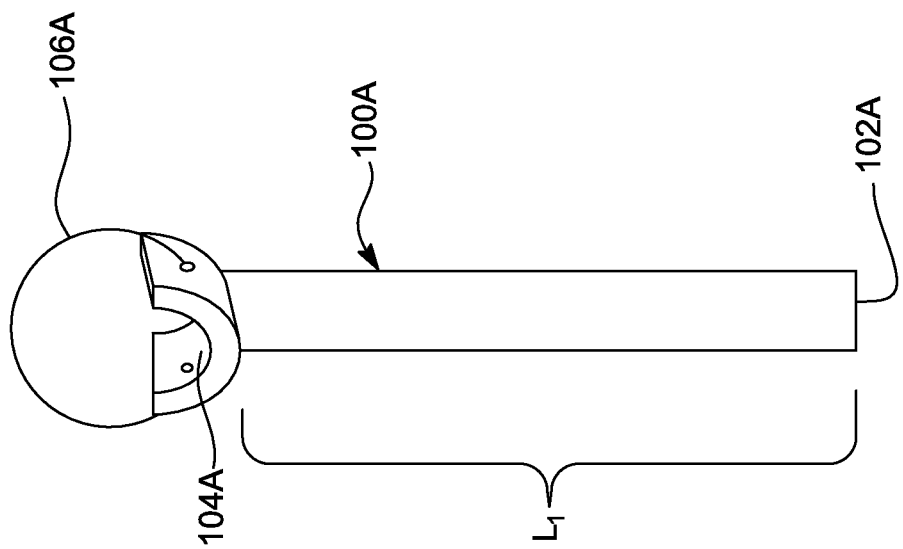
FIG. 1 is a hand drawn sketch of one embodiment of a support aid for use with a shovel, in accordance with the present subject matter, which can easily be used by a person to add mechanical advantage to an ordinary task of using a shovel.

Directing your attention initially to FIGS. 1 and 2, a first embodiment of my novel support 100A of the present subject matter shall now be described in detail. The support 100A is especially designed to be used with a shovel 50 having a blade 60 configured to move a load L such as a clod of soil, a predetermined amount of sand, or a certain amount of snow, fluffy or "heavy," from a first location to a second location. The shovel 50 includes a shaft or handle 70 dimensioned and configured for enabling a user U to use the blade 60 to engage the load. The support 100A consists of only three elements, namely, an integral base 102A at one end of the support 100A, an integral channel 104A at an opposite end of the support 100A, and a retainer 106A for securely retaining the handle 70 within the channel 104A.

Figure 2:
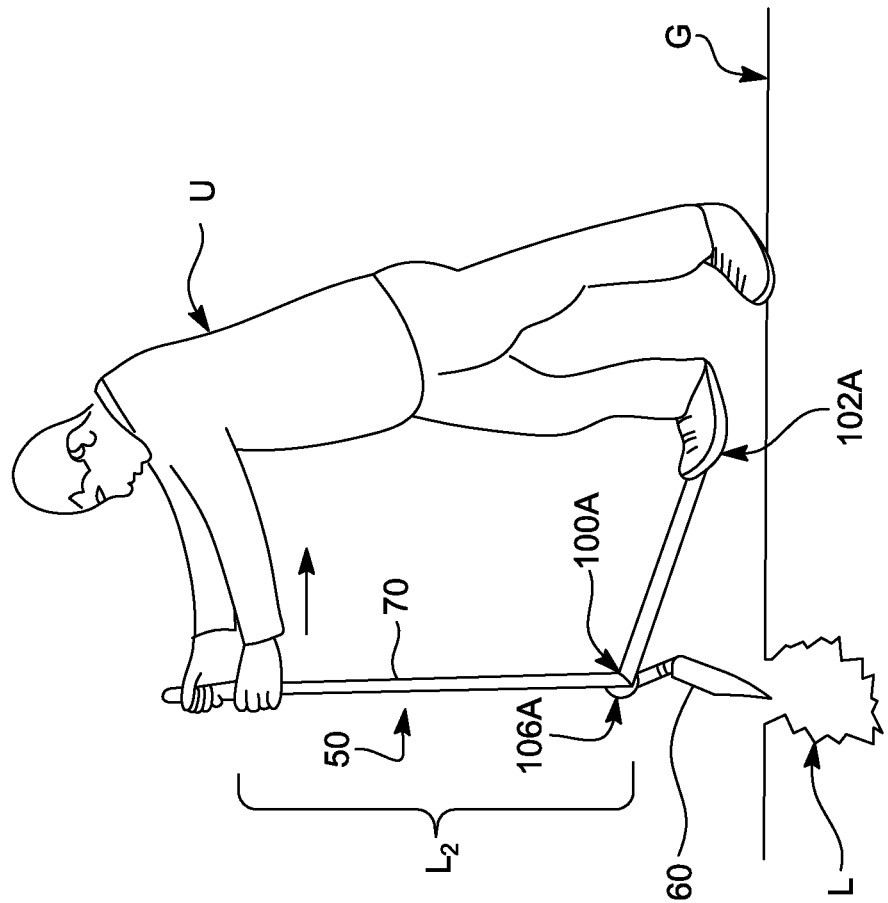
FIG. 2 is another sketch showing a person gaining mechanical advantage by using a support aid of the present subject matter to pry a load from the ground.
Figure 4:
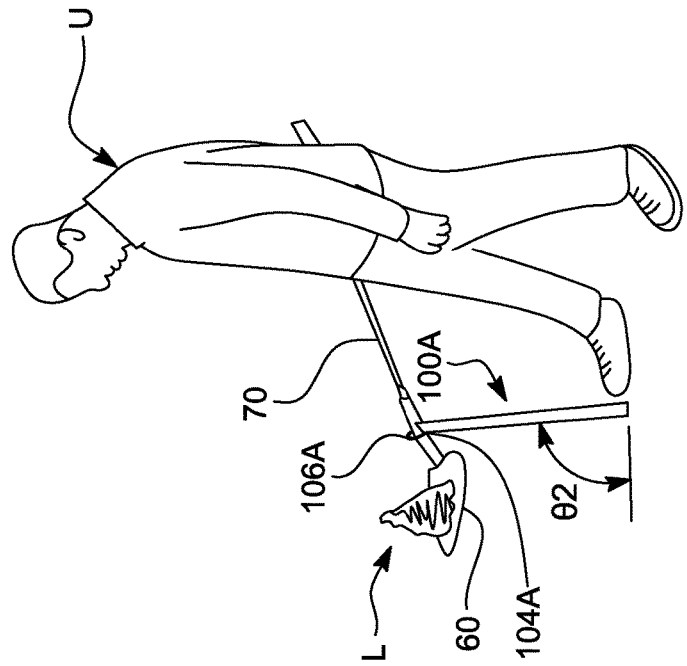
FIG. 4 is another sketch showing the support being used to suspend the load.
Figure 3:
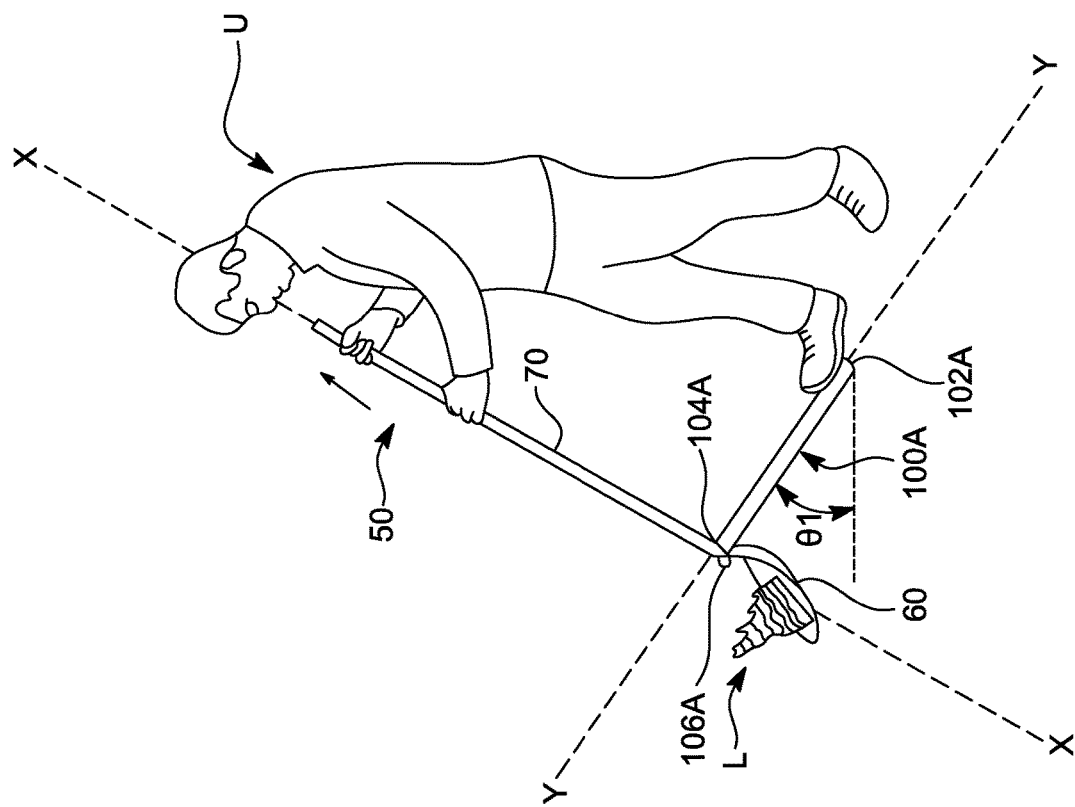
FIG. 3 is another sketch showing the person using the support to lift the load.

FIGS. 2 through 4 illustrate a method for using the novel support shaft 100A to pry a load L (FIG. 2) from the ground G (Step 1); lift the load L (FIG. 3) above the ground G (Step 2); and suspend the load L (FIG. 4) above the ground G (Step 3). In particular, in FIG. 2, the user U, is shown having one foot supported by the ground G. The user U can be seen using the other foot to secure the base 102A of the support shaft 100A, while at the same time using both of his arms to hold a distal end of the shovel handle 70. Throughout this patent specification, I shall refer to the shovel handle 70 as having a blade portion 60 and a distal end, opposite the blade portion 60, for a user to grasp. The user may, e.g., grasp the distal end for the purpose of rocking an end portion of shovel 50 (FIG. 2), secured by the retainer 106A within the channel 104A, in order to use the blade portion 60 of the shovel 50 to pry the load L from the ground G, as a result of the mechanical advantage provided by an effective length L1 (FIG. 1) of the support shaft 100A in combination with an effective length L2 (see FIG. 2) of the shovel handle 50.

In FIG. 3, the user U is shown, after having used the blade 60 to pry the load L from the ground G (FIG. 2) and after raising the load L above the ground. In accordance with the present subject matter, it is worth noting that the handle 70 of the shovel 50 defines a first longitudinal axis X-X and the support 100A defines a second longitudinal axis Y-Y. (Each of the handle 70 and the support 100A are substantially linear.) When used operatively by user U, the handle 70 is rotatable about the first axis X-X in the channel 104A relative to the support 100A.

Further in this regard, when thus used operatively by the user U, the channel 104A is pivotable about the base 102A from an initial angle Θ1 (FIG. 3) to a subsequent (greater) angle Θ2 (FIG. 4), when the base 102A is supported by the user U on the ground G, for suspending the load L above the ground G (FIG. 4).

Further in accordance with the present subject matter, it is worth noting at this point that the first and second longitudinal axes intersect in, or substantially within, the channel 104A. (See FIG. 3.) Since the support 100A and the shovel handle 70 are each substantially linear, and since the first and the second axes intersect in or substantially within the channel 104A, the process which comprises: (step 1) prying the load L from the ground G; (step 2) lifting the load L from the ground G; and (step 3) suspending the load L above the ground G (see FIG. 2), results in balanced movement of a load from a first location to a second location, which serves to minimize muscle strain of a user U using the shovel 50 and support 100A.

For reasons which are genuinely believed to be clear to those of ordinary skill in this field, the prior art noted in the background would not be able to achieve equivalent balanced movement of a load from a first position to a second position.

FIG. 5 depicts details of the channel 104A and retainer 106A which enable sliding engagement of the handle 70 within the channel 104A along a location of the handle 70 that is closely adjacent blade 60 of shovel 50. FIG. 6 depicts details similar to those shown in FIG. 5, but which depict an embodiment of the shovel 50 which includes a hollow, substantially cylindrical blade portion or component 80 (unitary with the blade 60) into which the handle 70 of shovel 50 is securely fixed.

FIG. 7 depicts another embodiment of a support 100B having a base 102B, a channel 104B, and a retainer 106B; and FIG. 8 depicts yet another embodiment of a support 100C having a base 102C, a channel 104C, and a retainer 106C, with both of these embodiments being in accordance with the present subject matter.

In certain embodiments, the support 100A, 100B or 100C can have a length ranging from about 18 inches to about 32 inches. In certain other embodiments, the support 100A, 100B or 100C can have a length ranging from about 16 inches to about 24 inches. Also, in certain embodiments, the retainer 106A, 106B or 106C loosely secures the handle 70 of the shovel 50 within the channel 104A, 104B or 104C for enabling the channel 104A, 104B or 104C to slide freely along handle 70. As a result, handle 70 of shovel 50, when secured within the channel 104A, 104B or 104C is extendable and retractable relative to the channel 104A, 104B or 104C.

I recently found it desirable, on occasion, to prevent rotation of the support about the axis Y-Y (FIG. 3) when performing steps described above (FIGS. 1-3).

Happily, I quickly developed additional embodiments of my support aid. Each additional embodiment is designed to enable a user to substantially lower a likelihood of such rotation. My fourth embodiment, support 100D (FIG. 9), has a base 102D, a channel 104D, and a retainer 106D. A cross section taken along longitudinal axis Y-Y of the fourth embodiment (FIG. 10) is rectangular, enabling a user to employ the rectangular cross section flat surfaces to substantially lower a likelihood of undesirable rotation. A fifth embodiment, support 100E (FIG. 11), is hexagonal in cross section along the longitudinal axis Y-Y. A sixth embodiment, 100F (FIG. 12), is square in cross section along the longitudinal axis Y-Y. The flat surfaces (FIGS. 10-12) of these embodiments of my support aid ("support") enable a user to substantially lower the likelihood of undesired rotation about axis Y-Y.

Features and advantages summarized above for support aids ("supports") 100A, 100B, and 100C are inherently provided by supports 100D, 100E, and 100F.

What has been illustrated and described in this application is a support aid for a shovel. While the present subject matter has been described with reference to six illustrated embodiments, the present subject matter is not limited to these embodiments. On the contrary, many alternatives, changes, and/or modifications will become apparent to those of ordinary skill in the field of the present subject matter after this patent application has been read and understood. Thus, all such alternatives, changes, or modifications are to be viewed as being part of the present subject matter insofar as they fall within the scope of the appended claims.

I claim:

1. A support aid for digging a portion of the ground and prying a load from the dug-portion of the ground using a shovel having a ground-engageable blade, wherein the shovel includes a handle configured for enabling a user to use the blade to dig in the ground for engaging the load, wherein the support aid comprises:
   a shaft having an integral base at one end portion thereof, wherein the base is configured to contact and be supported by the ground,
   an integral channel at an opposite end portion of the shaft, wherein the channel is configured to receive a handle-engaging end portion of the blade, and
   a retainer configured for securing the handle-engaging end portion of the blade within the channel,
   wherein the handle defines a first longitudinal axis,
   wherein the shaft defines a second longitudinal axis,
   wherein the handle-engaging end portion of the blade is extendable and retractable relative to the channel for urging the load onto the blade, wherein the first and second longitudinal axes intersect within or substantially within the channel, wherein an intersection of the second axis with a level surface portion of the ground defines an acute angle, whereby pivoting the shaft from the acute angle to another angle greater than the acute angle, with the base contacting the ground and the blade carrying the load, suspends the load above the ground.

2. The support aid of claim 1, wherein the support has a length ranging from about 18 inches to about 32 inches.

3. The support aid of claim 2, wherein the shaft is rectangular in cross section along the longitudinal axis.

4. The support aid of claim 2, wherein the shaft is square in cross section along the second longitudinal axis.

5. The support aid of claim 2, wherein the shaft is hexagonal in cross section along the second longitudinal axis.

6. The support aid of claim 1, wherein the support has a length ranging from about 16 inches to about 24 inches.

7. The support aid of claim 6, wherein the shaft is rectangular in cross section along the second longitudinal axis.

8. The support aid of claim 6, wherein the shaft is hexagonal in cross section along the second longitudinal axis.

9. The support aid of claim 6, wherein the shaft is square in cross section along the second longitudinal axis.

10. The support aid of claim 1, wherein the retainer loosely secures the handle within the channel.

11. The support aid of claim 1, wherein the shaft is not rotatable about the second axis in relation to the ground when the base is urged against the ground by a user.

12. The support aid of claim 1, wherein the handle is rotatable about the first axis in relation to the channel.

* * * * *